United States Patent
Netzer (10) Patent No.: US 6,672,990 B2
(45) Date of Patent: Jan. 6, 2004

(54) METHOD FOR CONTROLLING AN AUTOMATIC TRANSMISSION

(75) Inventor: Wolfgang Netzer, Kressbronn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/922,132

(22) Filed: Aug. 3, 2001

(65) Prior Publication Data

US 2002/0025887 A1 Feb. 28, 2002

(30) Foreign Application Priority Data

Aug. 26, 2000 (DE) ......................... 100 42 146

(51) Int. Cl.[7] ............................................. F16H 61/26
(52) U.S. Cl. ................... 477/156; 475/123; 74/336 R; 701/56; 701/60; 701/66
(58) Field of Search ................... 475/123; 477/156, 477/154, 159, 160, 164; 701/59, 60, 66, 56; 74/336 R (56) References Cited

U.S. PATENT DOCUMENTS

| 4,653,350 A | * | 3/1987 | Downs et al. ................. 701/58 |
| 4,707,789 A | * | 11/1987 | Downs et al. ................. 477/154 |
| 5,014,573 A | * | 5/1991 | Hunter et al. ................. 477/61 |
| 5,038,286 A | * | 8/1991 | Asayama et al. ............. 477/143 |
| 5,072,390 A | * | 12/1991 | Lentz et al. ................. 477/154 |
| 5,086,665 A | * | 2/1992 | Milunas et al. .............. 477/143 |
| 5,086,670 A | * | 2/1992 | Nitz et al. .................... 477/154 |
| 5,151,858 A | * | 9/1992 | Milunas et al. ................ 701/48 |
| 5,282,401 A | * | 2/1994 | Hebbale et al. .............. 475/123 |
| 5,301,572 A | * | 4/1994 | Tanaka et al. ................ 475/123 |
| 5,421,791 A | * | 6/1995 | Futawatari .................... 475/117 |
| 5,467,854 A | * | 11/1995 | Creger et al. ............. 192/87.18 |
| 5,551,930 A | * | 9/1996 | Creger et al. ................. 475/123 |
| 5,580,332 A | * | 12/1996 | Mitchell et al. .............. 477/143 |
| 5,719,768 A | | 2/1998 | Tashiro et al. ........ 364/424.096 |
| 5,820,514 A | | 10/1998 | Adachi ......................... 477/46 |
| 5,879,268 A | * | 3/1999 | Yasue et al. ................. 477/143 |
| 5,967,918 A | | 10/1999 | Knapp et al. .................. 474/28 |
| 6,101,438 A | | 8/2000 | Staiger et al. ................. 701/55 |
| 6,155,948 A | * | 12/2000 | Gierer ......................... 475/123 |
| 6,219,607 B1 | | 4/2001 | Piepenbrink et al. .......... 701/51 |
| 6,226,584 B1 | * | 5/2001 | Carlson ....................... 475/123 |
| 6,253,140 B1 | * | 6/2001 | Jain et al. ..................... 701/67 |
| 6,435,049 B1 | * | 8/2002 | Janasek et al. .............. 477/143 |

FOREIGN PATENT DOCUMENTS

| DE | 195 47 501 A1 | 7/1996 | ........... F16H/61/40 |
| DE | 195 46 292 A1 | 6/1997 | ........... F16H/61/06 |
| DE | 196 06 311 A1 | 8/1997 | ........... F16H/59/06 |
| DE | 197 15 132 A1 | 10/1997 | ........... F16D/48/06 |
| DE | 198 47 205 A1 | 4/2000 | ........... F16H/59/14 |
| DE | 199 43 332 A1 | 3/2001 | ........... F16H/59/48 |

\* cited by examiner

*Primary Examiner*—Rodney H. Bonck
*Assistant Examiner*—David D. Le
(74) *Attorney, Agent, or Firm*—Davis & Bujold, PLLC (57) ABSTRACT

A method for control of a transmission of a vehicle, especially of an automatic transmission or an automated manual mechanical transmission with hydraulically actuatable shifting elements is described. A speed signal (n_ab_ist, n_t_ist) of the output train with precalculatable time curve (n_ab_soll, n_t_soll) is determined and for adjustment of a nominal filling of the shifting elements an interference signal (P1, P2, P3, P4, PF1, PF2, PF3, PF4) is applied. In case of a untolerable divergence of the speed signal (n_ab_ist, n_t_ist) of the output train from its precalculated curve, a divergence from the nominal filling of the shifting element is detected, the information being processed for control of the shifting elements.

20 Claims, 5 Drawing Sheets

METHOD FOR CONTROLLING AN AUTOMATIC TRANSMISSION

FIELD OF THE INVENTION

The invention concerns a method for controlling a transmission of a motor vehicle.

BACKGROUND OF THE INVENTION

The continuously increasing demands on the functionality of automatic transmissions by shifting quality requirements, the need of more spontaneity the constantly enlarging number of gears to be shifted and the higher economical requirements on automatic transmissions are taken into account in the practice by an adaptive control for automatic transmissions. With such an adaptive transmission control (AGS), the generally pursued end is to adapt the gear selection to the behavior of the individual driver taking into consideration at the same time environmental conditions and concrete driving situations. Thereby among other things, the control comfort should be improved by reducing both the required engagements by the driver and the shifting frequency in sporting driving mode. Besides, the fuel consumption in smooth driving mode is to be lowered, the same as, for example, driving safety increased on even roads.

In order to be able to satisfy, together with an automatic gear selection dependent on driving situation, the requirement of adapting a gear shift to tolerances of the components of shifting elements of the automatic transmission, it has for that purpose been retained in the practice taking into consideration during a gear shift influences of tolerances of the components of shifting elements of the transmission. Here is first established how a transmission or a shifting element of the automatic transmission affected by tolerances of the component parts behaves under minimum and maximum specified tolerance during a gear shift. With the aid of this observation, a shifting cycle is established wherein, with the shifting cycle based on tolerances of components, there are tuned and stored in an electronic control unit pressure curves for a charge pressure abutting on a shifting element during a filling phase and a differential pressure which abuts on the shifting element during a shifting phase and constructively acts upon the filling pressure ultimately producing the engagement of the shifting element.

However, due to the multiplicity of influences that appear in all operating points as result of the tolerances of the components, scatterings of operating parameters of the automatic transmission and other influences, it is not possible with the former steps to derive the right reaction in order to optimize a gear shift, following an evaluated gear shift, that is, to prevent shifting inaccuracies that result from tolerances of components and wear of the shifting elements, the same as temperature influences and scattering fo the operating parameters on the concerned operating point of the automatic transmission.

Therefore, the problem on which this invention is based is to make a method available for control of a transmission of a motor vehicle with which method it is possible to carry out for different influences which impair a suitable gear shift adaptation from which can be derived the respective right reaction for optimizing a subsequent gear shift, especially with regard to a correct clutch filling.

The invention solves this problem with a method according to claim 1.

SUMMARY OF THE INVENTION

The invention makes use of the knowledge that an impact or jolt occurring during a bad gear shift results in an acceleration or deceleration of the vehicle and thus necessarily goes along with a change of a speed signal of the output train. According to the invention, especially the output speed signal is relatively uniform and very closely resembles a straight line, for example, in a pull upshift. Likewise, up to the actual speed jump, this applies to the turbine speed. Divergences from the straight line indicate irregularities in the output speed curve which are to be traced back to an engagement impact.

In the inventive method, a speed signal of the output train is determined with precalculatable time curve and for adjustment of a nominal filling of the shifting elements, an interference signal is applied to the shifting element observed at the moment, a divergence from the nominal filling of the shifting element is determined in case of an Intolerable divergence of the speed signal of the output train from its precalculated curve. This information is processed for control of the shifting elements.

Irregularities of the speed signal of the output train, which can be detected represent events that detract from the shifting quality, such as brief acceleration in creases or breakdowns, due to pressure pulses in clutches or interruptions of frictional engagement, a shifting jolt resulting from too long a rapid filling time of an engaging shifting element, a brief deceleration of the vehicle due to strong overlapping before the grinding phase of the shifting elements that take part in an overlapping gear shift, or a shifting jolt at the end of a gear shift resulting from too early starting of the closing ramp of an engaging shifting element.

From the unexpected changes of the speed curve can be detected not only the presence of an impact indicative of a bad shifting quality but also the nature and strength of an impact, it being possible to use this information for an adaptation control. With the inventive method not only broadening of already existing adaptations are possible, but there can also be newly defined numerous adaptations, such as a rapid filling adaptation, a charge pressure adaptation, an overlapping adaptation, synchronous adaptation, supporting pressure adaptation for coasting downshifts, engine engagement adaptations and different adaptations of regulated lock-up clutch.

In each of these different adaptations, the inventive method displays considerable advantages. Thus it is possible to apply rapid filling time adaptation and charge pressure adaptation to all gear shifts and the clutch fillings for each individual transmission can be optimally adjusted. All tuning works are eliminated relative to rapid filling and filling equalization. Costly marginal sampling analyses in this connection are superfluous and the cost in cold tests also can be significantly reduced. Negative consequences on the shifting curve, due to incorrect clutch filling, can be prevented by means of the inventive method.

For example, observing the application to an overlapping adaptation, it is possible with the inventive method to optimally adjust the overlapping phase of a pull upshift for each transmission separately, that is, the moment of start of the engaging clutch based on the disengaging clutch whereas formerly one adjustment applied to all transmissions so that all scatterings in the tolerance chain had to be covered.

Likewise the use of the inventive method in an engine engagement adaptation is very advantageous where the intensity of the engine engagement for upshifts in the pull operation is self-optimizingly adjusted. A tuning of the engine engagement is no longer needed here, since its intensity can be adapted so that the acceleration behavior of the vehicle is optimal during the gear shift.

The start of the closing ramp also can be self-optimizingly designed with the inventive method wherein corresponding tuning works are eliminated, since the closing ramp is individually adjusted for each transmission.

An extensive tuning of a transmission operated with the inventive method is no longer required, since it is possible by evaluating the divergences of the speed signal from its precalculated curve, to carry out a compensation of tolerances of components of the shifting elements of the transmission for different shifting strategies or kinds of shifting, whereby tolerances of components determined by the manufacturing process and also a wear of components occurring during the operation of the transmission or the shifting element thereof can be quickly compensated.

At the same time, the inventive method makes a very accurate adaptation of the control of the shifting elements possible, since not only is there detected an impact on the output speed signal and with shifted gear on the turbine speed signal, which impact can be felt as disturbing by the occupants of the vehicle but even impacts on the speed signal so small that a driver cannot perceive them can also be already detected.

BRIEF DESCRIPTION OF THE DRAWINGS

Other advantages and development of the invention will now be described, by way of example, with reference to the accompanying drawings in which.

DETAILED DESCRIPTION OF THE INVENTION

Figure 1:
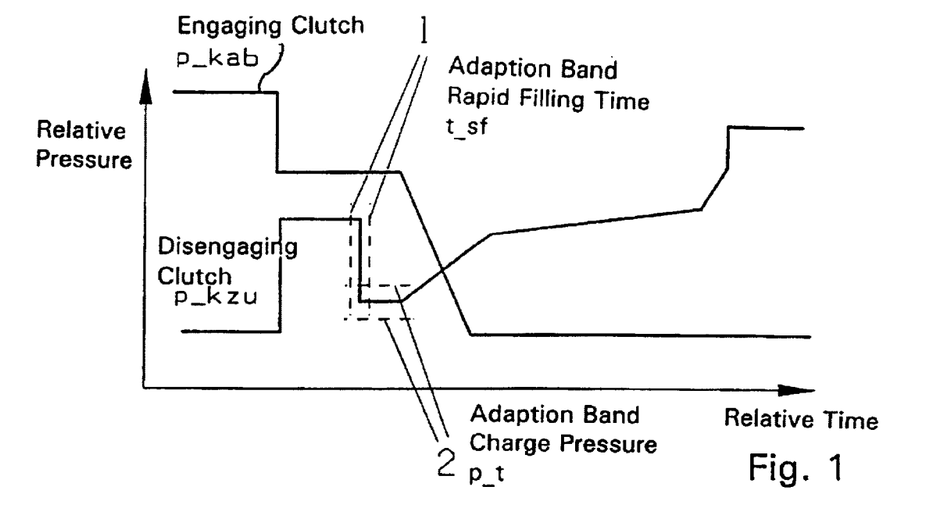
FIG. 1 is two extensively schematized pressure curves of an engaging shifting element and of a disengaging shifting element during an overlapping gear shift.

FIG. 1 extensively shows schematized curves of speed signals of an output train. Each of the curves shown is a pressure curve p_kab, p_kzu of an engaging or of a disengaging shifting element wherein, especially in the pressure curve p_kzu of the engaging shifting element, an adaptation band 1 is shown for an adaptation of a rapid filling time t_sf during a filling phase of the engaging shifting element. In the adaptation that follows, described in detail by way of example of the rapid filling time t_sf, for compensation of divergences found during the adaptation of actual values n_ab_ist, n_t_ist of an output speed and/or of a turbine speed from a determined nominal value curve n_ab_soil, n_t_soll, the output speed and/or the turbine speed within the adaptation band 1 are changed so that the divergences found are neutralized. At the same time, the rapid filling time t_sf for adjusting an optimal filling of the shifting element is gradually adapted by an offset value T_TSFHAINC, T_ZWTSFINC, T_TSFRAUBINC; T_TSFRAINC.

In addition Is shown one other adaptation band 2 in the pressure curve k_ab, p_kzu of the engaging element within which a charge pressure p_f is adapted for compensation of divergences of the actual value curve n_ab_ist, n_t_ist of the output speed and/or of the turbine speed from a determined nominal value curve n_ab_soll, n_t_soll. Here takes place for adjustment of an optimal filling of the shifting element, a gradual adaptation of the charge pressure p_f by an offset value P_PFHAINC, P_ZWPFINC, P_PFRAUEBINC, P_PFRAINC.

Figure 2:
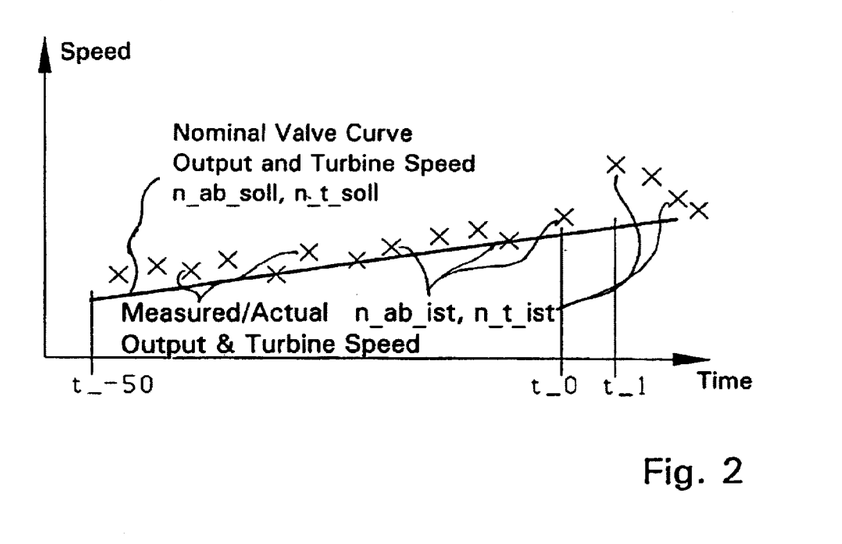
FIG. 2 is a nominal value curve of an output speed and/or of a turbine speed determined from detected actual values of the output speed and or of the turbine speed.

FIG. 2 shows a nominal value curve n_ab_soll, n_t_soil of the output speed and of the turbine speed which is determined with the aid of measured values or actual values n_ab_ist, n_t_ist of the output speed and of the turbine speed via a calculation pattern stored in an electronic unit of the transmission.

Herebelow the cycle of the inventive method is described with the aid of the output speed n_ab wherein the described cycle obviously is to be applied also to an observation of the turbine speed n_t, of a web speed of an acceleration signal, or of any other speed signal of the output train.

To determine the nominal curve n_ab_soll of the output speed, the speed signal of the output speed n_ab is continuously observed during a certain period such as 500 ms. During the time period or the defined time window, a measurement is carried out at uniform intervals such as of 10 ms. In each of said measurements is determined an actual value n_ab_ist of the output speed. During the whole space of time thus result 50 actual values n_ab_ist of the output speed which are used for calculating the nominal value curve n_ab_soil of the output speed.

By means of this nominal value curve n_ab_soil of the output speed is precalculated for a certain time, the nominal value curve n_ab_soil of the output speed for a determined period in the future. The precalculated time curve n_ab_soil or nominal curve represents a curve averaged via a calculation pattern of the actual values of the speed signal n_ab_ist of the output train used to determine said nominal value curve, there being taken as base in the precalculation as calculation pattern in the instant embodiment, an extrapolation process. As shown in FIG. 2, the measurement of the output speed n_ab is carried out in the time period between the moment t_50 and the moment t_0. The nominal value curve n_ab_soll of the output speed is precalculated, for example, up to one other moment t_1 and compared with one value of the output speed n_ab measured at this moment. Thus is evaluated an already existing sensor signal, namely, one of the already mentioned output speed n_ab, from which can be determined a curve foreseeable in time.

If measured and calculated values of the output speed n_ab coincide, then there is no interference of the speed signal. But if a sufficiently great divergence between measured and calculated value is found, it is to be assumed that an acceleration change or a change of the output speed n_ab has taken place. By assessing when, how long, to what extent and with what sign the acceleration change has occurred, it is possible to conclude which event has led to the acceleration change.

For example, if a measured value is below the calculated value, then what exists is a deceleration of the vehicle which in the first place could have different causes. But when this occurs precisely at the end of the rapid filling phase of the engaging clutch, it can be assumed that the rapid filling time t_sf for this clutch and for the actual operating point was set too long.

On the contrary, if the measured value of the output speed n_ab_ist is above the extrapolated value, for example, at a quite specific moment at the end of the grinding phase of a pull upshift, then this indicates a closing ramp of the engaging clutch that has started too soon.

In each case, a measured value strongly diverging from the extrapolated value should not be used, or used only with limitation, for further calculation of the nominal value curve n_ab_soll. This limitation can obviously be variably established for the existing utilization.

The straight line shown in FIG. 2 reproduces a relatively constant engine and output torque where accelerator pedal movements during the gear shift are mostly disregarded. But such accelerator pedal movements have, as a consequence of the torque changes, slight changes in the output speed gradient which lead to an inaccurate extrapolation. But since the influence of the torque upon the output speed gradient is known at all operating points, it is possible during load changes to promptly correct the calculation of the nominal value curve n_ab_soll or of the compensation straight lines.

Figure 3:
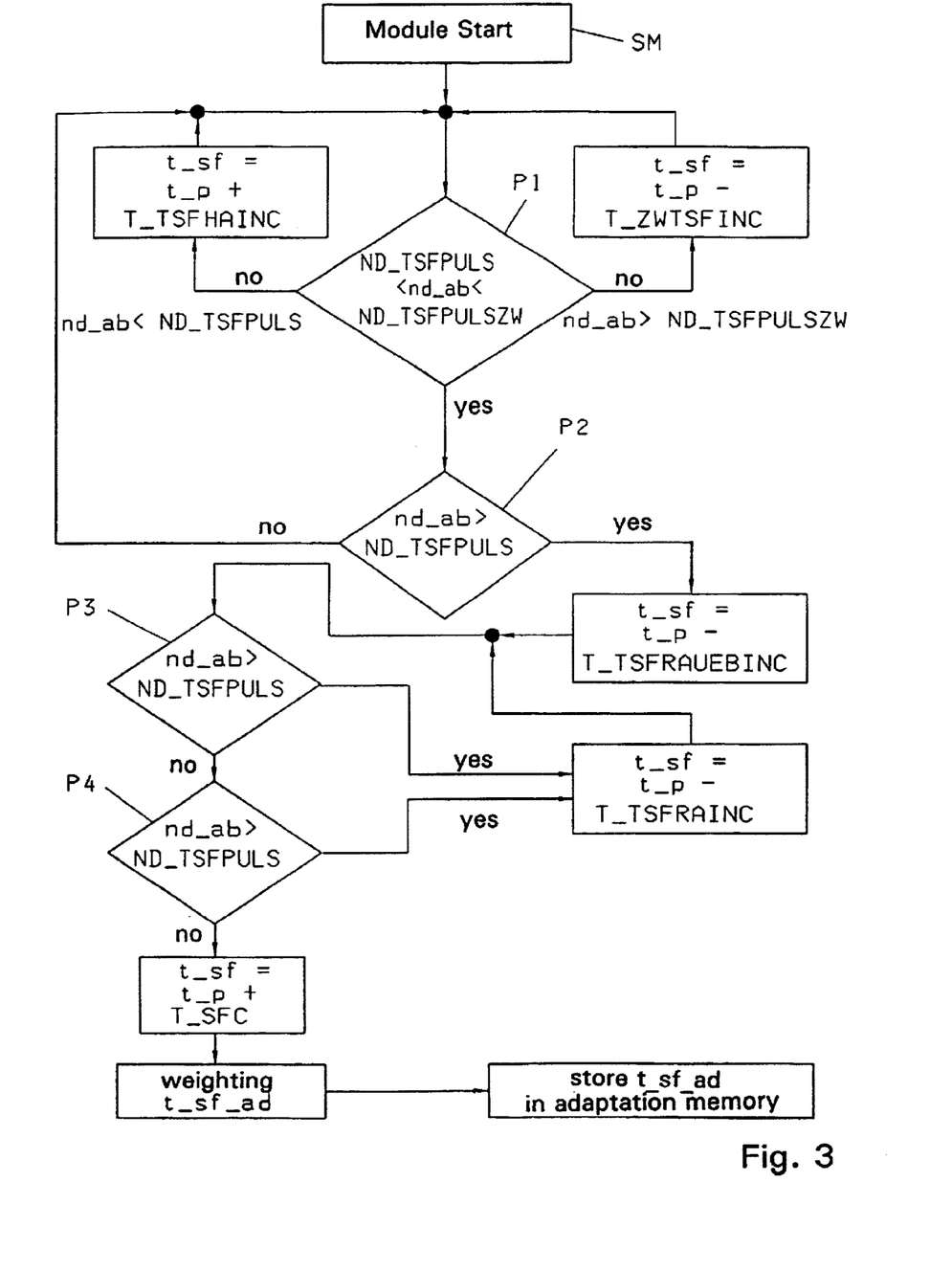
FIG. 3 is a flow chart showing the cycle of an adaptation of a rapid filling time of a filling phase of a shifting element.

To be able to counteract or neutralize divergences or speed differences of the actual value curve n_ab_ist of the output speed from the nominal value curve n_ab_soll which are determined via the nominal value curve n_ab_soll of he output speed, an adaptation of a rapid filling time, shown in FIG. 3 in a flow chart, is carried out.

As is to be understood from FIG. 3, different starting criteria are first analyzed in a starting module SM1, the adaptation of the rapid filling time t_sf being started in the presence of the starting criteria. The separate starting criteria will be discussed in detail in the description of FIG. 6.

During the adaptation of the rapid filling time t_sf, the rapid filing time t_sf, to determine an optimal filling of the shifting element, is gradually lengthened or shortened by an offset value T-TSFHAINC, T_ZWTSFINC, T_TSFRAUBINC, T_TSFRAINC, the shifting element being controlled with a rapid filling test pulse as interference signal during the adaptation of the rapid filling time t_sf, and a rapid filling test pulse represents a loading of a shifting element with a preset rapid filling pulse pressure over a preset rapid filling pulse time t_p.

The shifting element is first controlled with a first rapid filling test pulse P1 and, in case of a speed difference nd_ab, nd_t found between the actual value n_ab_ist of the output speed or the actual value n_t_ist of the turbine speed and the nominal value curve n_ab_soll, n_t_soll which speed difference is smaller than a lower threshold value ND_TSFPULS of a first tolerance band, the rapid filling time t_p is lengthened by an offset value T_TSFHAINC and the shifting element is again loaded with the first rapid filling test pulse P1 over the correspondingly increased actual rapid filling pulse time t_sf.

In a speed difference nd_ab found after the loading of the shifting element with the first rapid filling test pulse P1 which is greater than an upper threshold value ND_TSFPULSZW of the tolerance band, the rapid filling pulse time t sf is reduced by an offset value T_ZWTSFINC and the shifting element again is loaded with the first rapid filling test pulse P1 over the correspondingly reduced rapid filling time t_p.

On the contrary, after the loading of the shifting element with the first rapid filling test pulse P1, if a speed difference nd_ab of the output speed is established which is greater than the lower threshold value ND_TSFPULS and smaller than the upper threshold value ND_TSFPULSZW, an expected reaction is detected in the speed curve. To confirm this information, the shifting element is loaded with a second rapid filling test pulse P2 over the actual rapid filling pulse time t_p of the first rapid filling test pulse P1.

If an evaluation of the pulse test with the rapid filling test pulse P2 results in that a speed difference n_ab found after the loading or control of the shifting element with the second rapid filling test pulse P2 is lower than the threshold value ND_TSFPULS, a jump back is made again in the adaptation to before the first rapid filling test pulse P1 and again controlled with the first rapid filling test pulse P1 over the actually adjusted rapid filling pulse time t_p.

However, during the evaluation after the loading of the shifting element with the second rapid filling test pulse P3, if it is found that a speed difference nd_ab of the output speed is higher than the threshold value ND_TSFPULS, the actual rapid filling pulse time t_p is reduced by an offset value T_TSFRAUEBINC and the shifting element is loaded with a third rapid filling pulse P3 over the shortened actual rapid filling pulse time t_p. The actual rapid filling pulse time t_p is stored as rapid filling time t_sf in an intermediate memory which, in the instant embodiment, is situated in the electronic control unit of the transmission.

On the contrary, the actual rapid filling pulse time t_p is reduced by an offset value T_SFRAINC and the shifting element is loaded with the third rapid filling test pulse P3 over the re-adapted actual rapid filling pulse time t_p when during a control of the shifting element with the third rapid filling test pulse P3 it is found that a speed difference nd_ab is higher than the threshold value ND_TSFPULS.

However, when after the loading of the shifting element with the third rapid filling test pulse P3 a speed difference nd_ab of the output speed is found which is lower than the threshold value ND_TSFPULS, the shifting element is controlled with a fourth rapid filling test pulse P4 over the actual rapid filling pulse time t_p. If an evaluation of the fourth pulse test results in that a speed difference found after the control of the shifting element with the fourth rapid filling test pulse P4 is higher than a threshold value ND_TSFPULS, the actual rapid filling time t_p is reduced by an offset value T_SFRAINC and a jump back is made during the adaptation to before the third rapid filling test pulse P3. The shifting element is again loaded with the third rapid filling test pulse P3 over the actual rapid filling pulse time t_p reduced after loading of the shifting element with the fourth rapid filling test pulse P4.

After the loading of the shifting element with the fourth rapid filling test pulse P4, if a speed difference nd_ab of the output speed is found which is lower than the threshold value ND_TSFPULS, the actual rapid filling pulse time t_p is stored as re-adapted rapid filling time t_sf_ad in an adaptation memory of the electronic control unit and used as rapid filling time t_sf of a filling phase of the shifting element observed.

Prior to storing the adapted rapid filling time t_sf_ad in the adaptation memory, there is preferably undertaken a weighting in relation to a value of the rapid filling time formerly stored in the adaptation memory. This weighting is implemented, for example, with a usual filter algorithm.

Prior to carrying out the weighting, in the preferred embodiment shown, to the adapted rapid filling time t_sf a clutch-related offset value T_SFC is added, the correct value T_SFC representing a correction of the adapted rapid filling time t_sf relative to a rapid filling time found during a tuning of the transmission.

The variable offset values T_TSFHAINC, T_ZWTSFINC, T_TSFRAUBINC, T_TSFRAINC with which the rapid filling time t_psf is increased lie according to amount in a value range of preferably from 10 ms to 50 ms, it evidently lying in the expert's judgment to increase or reduce the value range in relation to the existing utilization.

The inventive rapid filling time adaptation shown applies to the pressure control of all clutches or brakes, that is, to all types of shifting and to every shifting, the same as to adaptations outside current gear shifts. At the same time, a re-adaptation, that is, the reduction of an actual value by an offset value, always takes place when, at a defined moment at the end of the rapid filling phase, an irregularity on the speed signal is detected with certainty. Upward adaptations shown in which an actual value is increased by an offset value are carried out during a very short rapid filling time t_sf, the rapid filling time t_sf being gradually increased until a reaction is detectable on the speed signal. Thereafter the rapid filling time t_sf, for example, is again taken back by a time quantum.

Figure 4:
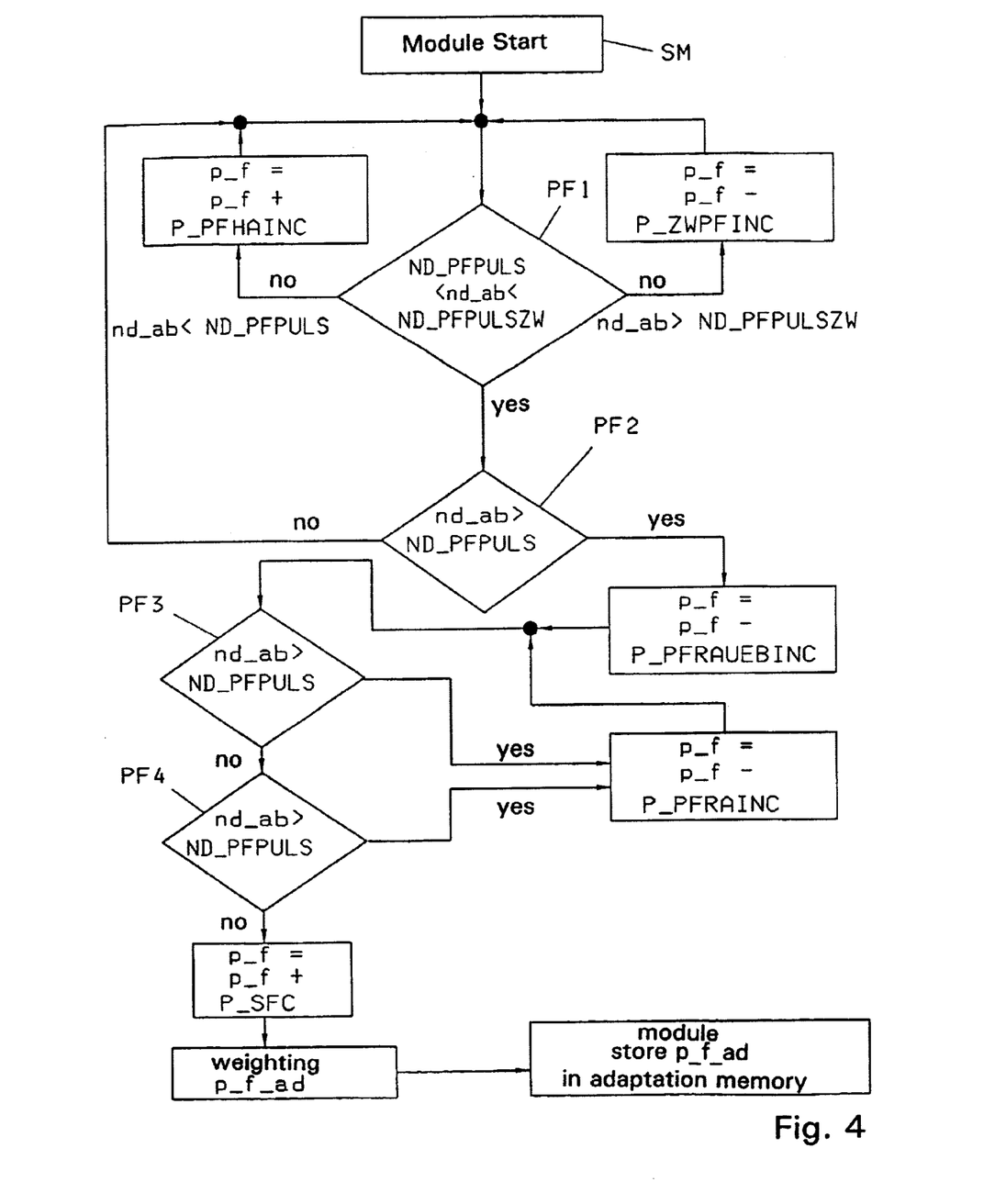
FIG. 4 is a flow chart showing the cycle of an adaptation of a charge pressure of a filling phase of a shifting element.
Figure 5:
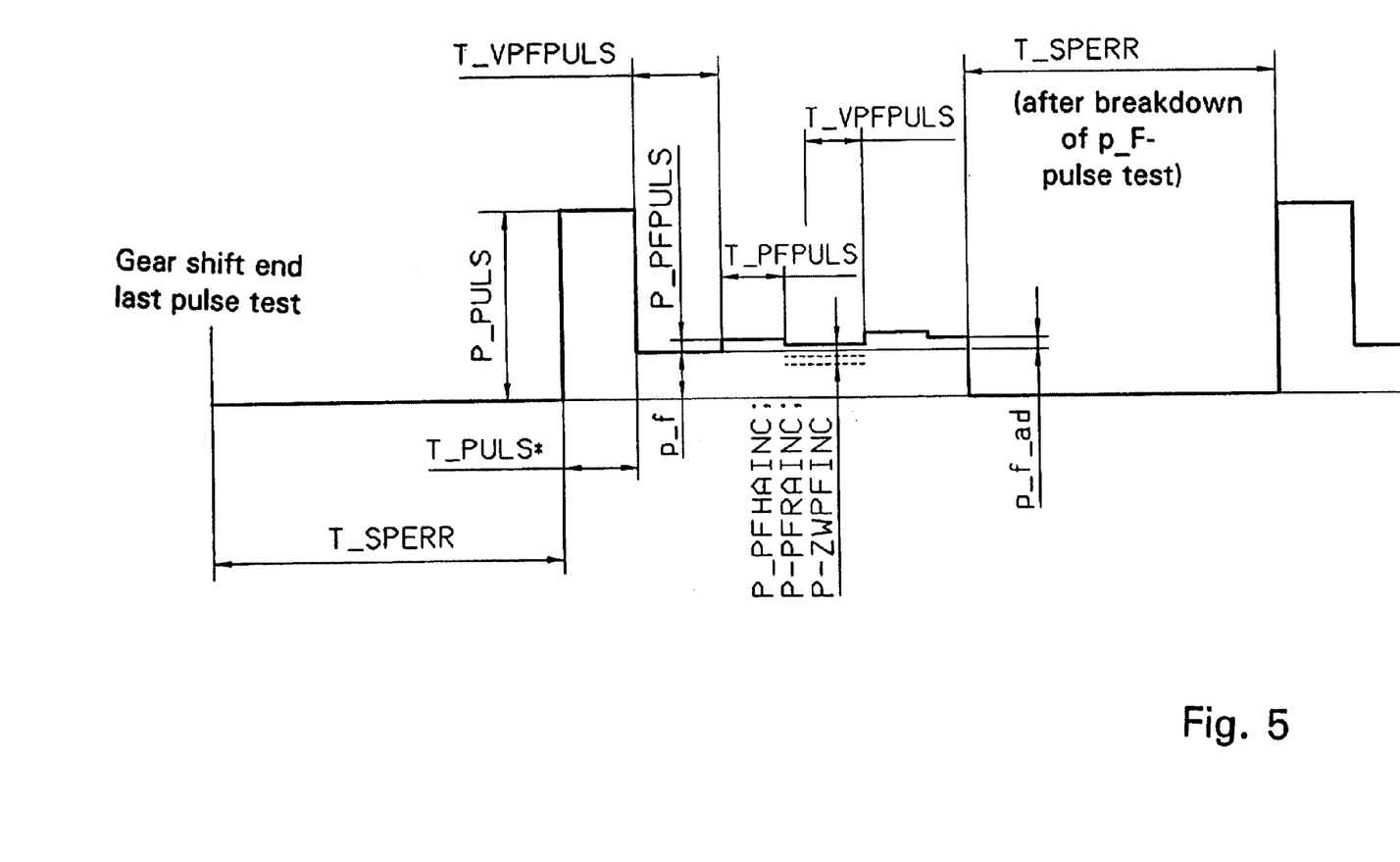
FIG. 5 is a schematized pressure curve in the course of time during the adaptation fo the filling element according to FIG. 4.

FIGS. 4 and 5 show a flow chart and a pressure curve for the cycle of the adaptation of the charge pressure p_f which is advantageously carried out after the adaptation of the rapid filling time t_sf. The charge pressure p_f is raised or lowered by an offset value P_PFHAINC, P_ZWPFINC, P_PFRAUEBINC, P_PFRAINC for adjustment of an optimal filling of the shifting element during the adaptation.

When the charge pressure p_f is too high, an overlapping occurs in the filling phase which causes a detectable acceleration mainly during low torques. This is also detectable on the output speed signal n_ab. By a re-adaptation shown below, the charge pressure p_f is again reduced to an admissible value.

The gradual increase of the charge pressure p_f in upward adaptation is, on the contrary, carried out until an overlapping or an acceleration break is clearly detected. Thereafter the charge pressure p_f can be taken back again by one step.

Figure 6:
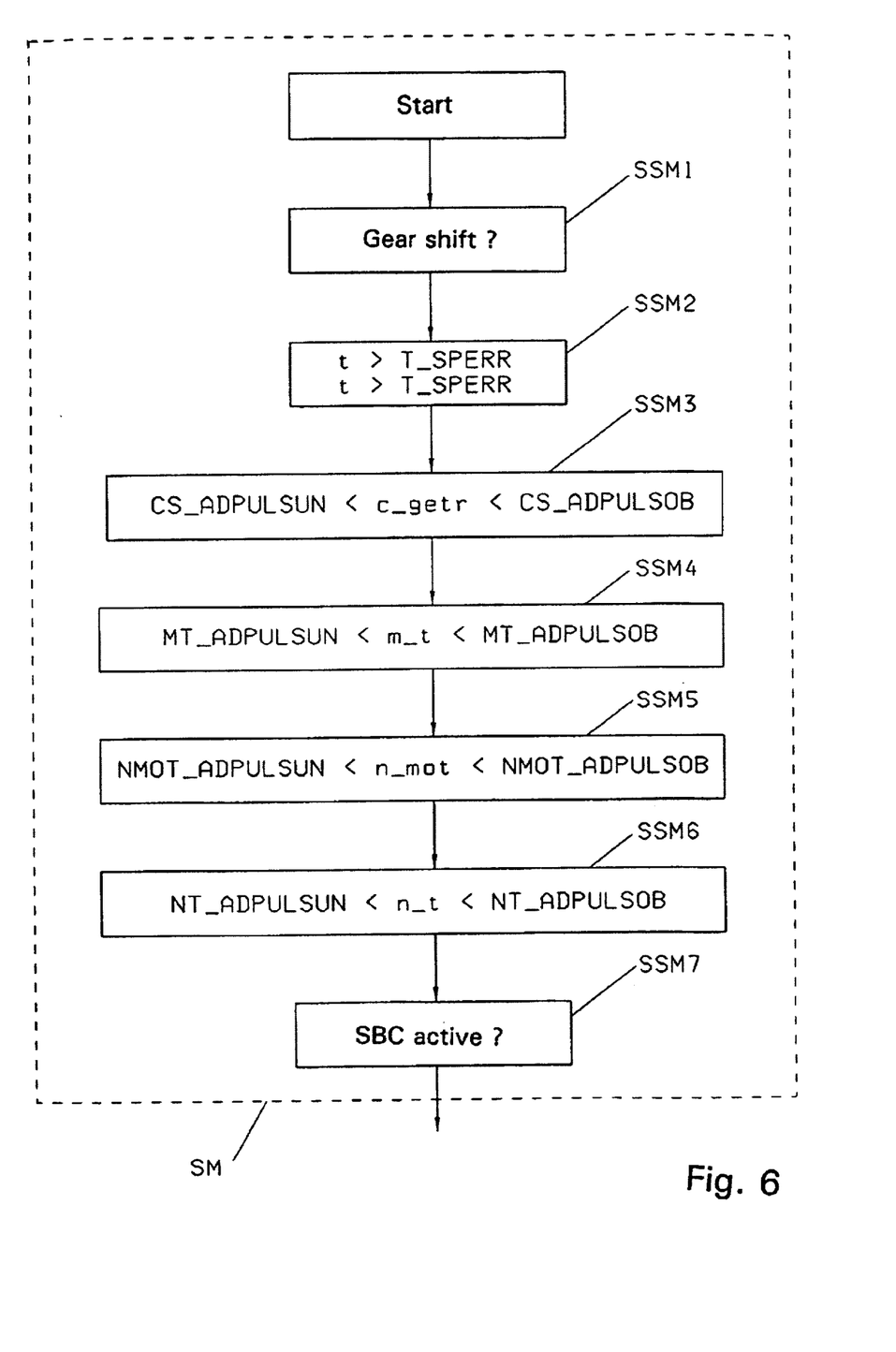
FIG. 6 is a flow chart of a starting module which is connected in series on the adaptation of the rapid filling time and on the adaptation of the charge pressure.

Before start of the adaptation of the charge pressure p_f, different starting criteria are tested in the starting module SM, shown in detail in FIG. 6, the adaptation of the charge pressure p_f being started when the starting criteria are met. To this end, the shifting element is first controlled with a rapid filling test pulse after which a hysteresis compensation is carried out.

After the control with the rapid filling test pulse during a time T_PULS with a pressure P_PULS, the shifting element is loaded for a defined moment T_VPFPULS with a present charge pressure p_f.

After lapse of the defined moment T_VPFPULS, the shifting element is controlled with a charge pressure test pulse PF1, PF2, PF3, PF4, a charge pressure test pulse representing each time a constructive loading of a shifting element with a preset charge pressure pulse pressure P_PFPULS to the charge pressure p_f during a preset charge pressure pulse time T_PFPULS.

The shifting element is first controlled with a first charge pressure pulse PF1 and in case of a speed difference nd_ab between the actual value n ab ist of the output speed and the nominal curve n_ab_soil of the output speed, which speed difference was found after the control and is lower than a lower threshold value ND_PFPULS of a second tolerance band, the charge pressure p_f is increased or upwardly adapted by an offset value P_PFHAINC and the shifting element is again constructively loaded during the first charge pressure test pulse PF1 to the increased actual charge pressure p_f. The actual charge pressure p_f is then stored in an intermediate memory of the electronic control unit and, after an evaluation effected after control of the shifting element with the diverse charge pressure test pulses, is changed by the respectively provided offset value or increment value and again stored in the intermediate memory.

In a speed difference nd_ab found after control of the shifting element with the first charge pressure test pulse PF1, which speed difference is higher than an upper threshold ND_PFPULSZW of the second tolerance band, the actual charge pressure p_f is reduced by an offset value P_ZWPFINC and the shifting element is again constructively loaded during the first charge pressure pulse PF1 with the change pressure pulse pressure P_PFPULS to the reduced actual charge pressure p_f.

If during the adaptation of the charge pressure p_f, after loading of the shifting element with the first charge pressure test pulse PF1, a speed difference nd_ab of the output speed is found which is higher than a lower threshold value ND_PFPULS and lower than an upper threshold value ND_PFPULSZW, then an expected reaction is detected in the speed curve. To confirm this statement, the shifting element is constructively loaded with the charge pressure pulse pressure P_PFPULS, during the charge pressure test pulse PF2, to the actual charge pressure p_f_akt of the first charge pressure test pulse PF1.

If after the loading of the shifting element with the second charge pressure test pulse PF2, a speed difference nd_ab of the output speed results which is lower than the threshold value ND_PFPULS, the shifting element again constructively controlled with the charge pressure pulse pressure P_PFPULS, during the first charge pressure test pulse PF1, to the actually adjusted charge pressure p_f.

In case of a pressure difference nd_ab of the output speed found after control of the shifting element with the second charge pressure test pulse PF2 higher than the threshold value ND_PFPULS, the actual charge pressure p_f is reduced by an offset value P_PFRAUEBINC and the shifting element is then loaded constructively with the charge pressure pulse pressure P_PFPULS, during the third charge pressure test pulse PF3, to the reduced actual charge pressure p_f.

During a control of the shifting element with the third charge test pulse PF3, when a speed difference nd_ab of the output speed is found, which is higher than the threshold value ND_PFPULS, the actual charge pressure p_f is reduced by an offset value P_PFRAINC and a jump results before the third pulse test so that the shifting element again is constructively loaded during the third charge pressure test pulse PF3 with the charge pressure pulse pressure p_PFPULS to the reduced actual charge pressure p_f.

On the contrary, if a speed difference nd_ab of the output speed found after loading of the shifting element with the third charge pressure test pulse PF3 is lower than a threshold value ND_PFPULS, the shifting element, during a fourth charge pressure pulse PF4 is constructively controlled with the charge pressure pulse pressure p_PFPULS to the actual charge pressure p_f.

After the control of the shifting element with the fourth charge pressure test pulse PF4, if a speed difference nd_ab of the output speed results which is higher than a threshold value ND_PFPULS, the actual charge pressure p_f_akt is reduced by an offset value P_PFRAINC and during the third charge pressure test pulse PF3 the shifting element is constructively loaded with the charge pressure pulse pressure p_PFPULS to the re-adapted actual charge pressure p_f jumping back for this purpose before the third pulse test.

After loading of the shifting element with the fourth charge pressure test pulse PF4, if a speed difference nd_ab of the output speed is found which is lower than the threshold value ND_PFPULS, an expected reaction is detected in the speed curve. The actual charge pressure p_f is then stored in the adaptation memory as new adapted charge pressure p_f_ad and used for a gear shift as charge pressure p_f of a filling phase of the shifting element in the pressure curve of the engaging shifting element p_kzu.

Before storing the adapted charge pressure p_fad in the adaptation memory, a weighting is made in comparison with a value of the charge pressure p_f formerly stored in the adaptation memory, which weighting is implemented, e.g., via a usual filter algorithm.

In the preferred performance of the inventive method shown, prior to the weighting, a clutch-based offset value P_SFC is added to the adapted charge pressure p_f_ad, said offset value P_SFC representing a correction of the adapted charge pressure p_f_ad relative to a charge pressure empirically established during a preceding tuning of the transmission.

According to the instant embodiment, the rapid filling time t_sf and the charge pressure p_f are adapted outside a gear shift, each adaptation taking place after expiration of a retention cycle T_SPERR which s started with termination of a gear shift, an initiation of a gear, or a termination of a rapid filling test pulse or of a charge pressure test pulse.

In the presence of a predefined breakdown criterion, the adaptation of the rapid filling time t_sf and the adaptation of the charge pressure p_f are terminated, an actual value of the rapid filling time t_sf or an actual value of the charge pressure p_f being stored upon the breakdown in an intermediate memory of the electronic control unit. When conditions or the predefined starting criteria for the performance of the adaptation of the rapid filling time t_sf or the adaptation of the charge pressure p_f are again present, the adaptations can be continued with the stored values with the state at the moment of the breakdown. This means that the adaptations are continued precisely at the point at which the breakdown occurred.

In one other variant of the method, diverging from the instantly described cycle, it can be provided that in the presence of the predefined starting criteria the adaptation is again started from the beginning.

Breakdown criteria, which lead to a non-evaluation of the adaptations, for example, are a change of load greater than a limit value of the load change, a turbine torque change greater than a limit value, or when a speed difference is found which is outside a defined limit range.

The repeated examination shown of the established reaction or of the speed difference nd_ab of the output speed during the adaptation of the rapid filling time t_sf and the adaptation of the charge pressure p_f is to be recommended in order to rule out an erroneous adaptation. But in a reliability of the method established over the operating duration, the repeated verification of the reactions found can also be reduced. Optimally top priority is to adjust the pressure curve of the engaging shifting element, especially during the filling phase, and under all circumstances to prevent a draining of the clutch during the charge pressure phase.

FIG. 6 shows the starting module SM in which different starting criteria are consecutively tested and when all starting criteria have been satisfied, the adaptation of the rapid filling time t_sf or the adaptation of the charge pressure p_f is started. If one of the starting criteria has not been met the adaptations are not carried out.

In step SSM1 is examined whether the shifting element observed is engaged in a gear shift or in the power flow of the transmission. If it is found that the shifting element is not taking part in a gear shift or is not involved in the power flow, in step SSM2 is examined whether, since the last gear shift in which the shifting element observed took part or a gear initiation or an earlier test pulse, the retention cycle T_SPERR has lapsed.

If the retention cycle T_SPERR still has not elapsed since the events, the starting module is discontinued branching back before the step SSM1 wherein after lapse of the retention cycle T_SPERR it is examined in step SSM3 whether a transmission oil temperature c_getr is within an admissible temperature range. The temperature range is formed by a top limit CS_ADPULSOB and a bottom limit CS_ADPULSUN. If the detected value of the transmission oil temperature c_getr is outside the temperature range, the starting module SM is discontinued branching back before step SSM1.

Otherwise, it is examined in step SSM4 whether a turbine torque n_t is within a torque range formed by the top limit MT_ADPULSOB and a bottom limit MT_ADPULSUN and in the presence of a turbine torque m_t the starting module SM is discontinued. If the actual turbine torque m_t is within the turbine torque range, in step SSM5 is examined whether an engine speed n_mot is within an admissible engine speed NMOT_ADPULSUN, NMOT_ADPULSOB and in case of a positive result of the inquiry, in step SSM6 is tested whether a turbine speed n_t is lower than a top limit value NT_ADPULSOB and higher than a lower bottom value NT_ADPULSUN.

In a positive result of the inquiry in step SSM6, in step SSM7 is tested whether a SBC function (stand-by-control) is active. In case of non_activated SBC function, the starting module SM is left and the adaptation of the rapid filling time t_sf or the adaptation of the charge pressure p_f is started.

It should finally be emphasized again that diverging from the variant described in the instant embodiment of the inventive method in the adaptation to a shifting element not precisely involved in a shifting operation, it also can be provided that the adaptation of the rapid filling time t_sf and the adaptation of the charge pressure p_f take place during one gear shift.

References 1 adaptation band for an adaptation of a rapid filling time t_sf
2 one other adaptation band
c_getr transmission oil temperature
CS_ADPULSOB upper transmission oil temperature for filling test
CS_ADPULSUN lower transmission oil temperature for filling test
n_ab output speed
n_ab_ist actual value of an output speed
n_ab_soll nominal curve of the output speed
n_mot engine speed
n_t turbine speed
n_t_ist actual value of a turbine speed
n_t_soil nominal curve of the turbine speed
nd_ab speed difference of the output speed
ND_PFPULS lower threshold value of the speed difference
nd_t speed difference of the turbine speed
ND_TSFPULS lower threshold value ND_TSFPULSZW upper threshold value
NMOT_ADPULSOB upper engine speed threshold for filling test
NMOT_ADPULSUN lower engine speed threshold for filling test
NT_ADPULSOB upper limit value of the turbine speed
NT_ADPULSUN lower limit value of the turbine speed
p_f charge pressure
p_f_ad new adapted charge pressure
p_f_akt actually adjusted charge pressure during charge pressure adaptation
p_kab pressure curve of a disengaging shifting element
p_kzu pressure curve of an engaging shifting element
P_PFHAINC offset value
P_PFHAUEBINC step size for upward adaptation in the testing loop
p_PFPULS charge pressure pulse pressure
P_PFHAINC step size for re-adaptation
P_PFHAINC offset value
P_PFRAUEBINC offset value
P_PULS pressure
P_SFC clutch-based offset value
P_ZWPFINC offset value
P1 first rapid filing test pulse
P2 second rapid filing test pulse
P3 third rapid filing test pulse
P4 fourth rapid filing test pulse
PF1 first charge pressure test pulse
PF2 second charge pressure test pulse
PF3 third charge pressure test pulse
PF4 fourth charge pressure test pulse
SBC stand-by-control function
SM start module
SSM1 first test step of the start module
SSM2 second test step of the start module
SSM3 third test step of the start module
SSM4 fourth test step of the start module
SSM5 fifth test step of the start module
SSM6 sixth test step of the start module
SSM7 seventh test step of the start module
t_0' moment
t_1 moment
t_−50 moment
t_p rapid filling pulse time
T_PFPULS charge pressure pulse time
T_PULS time
t_sf rapid filling time
t_sf_ad newly adapted rapid filling time
T_SFC clutch based offset value
T_SFRAINC offset value
T_SPERR retention cycle for filling test after last gear shift or test
T_SPERR retention cycle for filling test after last gear shift or test
T_TSFHAINC offset value
T_TSFRAINC offset value
T_TSFRAUBINC offset value
T_VPFPULS defined time period
T_ZWTSFINC offset value

What is claimed is:

1. A method for control of a transmission of a motor vehicle with hydraulically actuatable shifting elements wherein a shifting operation of a shifting element includes a rapid filling phase including a rapid filling time and a charge pressure phase wherein a charge pressure is provided to the element, comprising the steps of:
during a period outside of the shifting operation of the shifting element,
detecting a divergence of a transmission output train speed signal from a precalculated nominal transmission output speed curve, and
when the detected divergence is within one of a rapid filling phase tolerance band and a charge pressure tolerance band,
generating an interference signal according to the divergence, the interference signal being one of a rapid filling time test pulse and a charge pressure test pulse, and
superimposing the interference signal on a corresponding one of the rapid filling time of the rapid filling phase and the charge pressure of the charge pressure phase to adjust the one of the rapid filling phase and the charge pressure phase to reduce the divergence.

2. The method according to claim 1, wherein the transmission output train speed signal of the output train is one of an output speed, a turbine speed, or a speed signal equivalent thereto.

3. A method for control of a transmission of a motor vehicle with hydraulically actuatable shifting elements wherein a shifting operation of a shifting element includes a rapid filling phase including a rapid filling time and a charge pressure phase wherein a charge pressure is provided to the element, comprising step of:
during a period outside of the shifting operation of the shifting element,
detecting a divergence of a transmission output train speed signal from a precalculated nominal transmission output speed curve, and
when the detected divergence is within one of a rapid filling phase tolerance band and a charge pressure tolerance band,
generating an interference signal according to the divergence, the interference signal being one of a rapid filling time test pulse and a charge pressure test pulse,
superimposing the interference signal on a corresponding one of the rapid filling time of the rapid filling phase and the charge pressure of the charge pressure phase to adjust the one of the rapid filling phase and the charge pressure phase to reduce the divergence, and
determining the precalculated nominal transmission output speed curve as an averaged calculation of a pattern of actual values of the transmission output train speed signal during a time window.

4. A method for control of a transmission of a motor vehicle with hydraulically actuatable shifting elements wherein a shifting operation of a shifting element includes a rapid filling phase including a rapid filling time and a charge pressure phase wherein a charge pressure is provided to the element, comprising the steps of:
during a period outside of the shifting operation of the shifting element, detecting a divergence of a transmission output train speed signal from a precalculated nominal transmission output speed curve, and when the detected divergence is within one of a rapid filling phase tolerance band and a charge pressure tolerance band, generating an interference signal according to the divergence, the interference signal being one of a rapid filling time test pulse and a charge pressure test pulse, and superimposing the interference signal on a corresponding one of the rapid filling time of the rapid filling phase and the charge pressure of the charge pressure phase to adjust the one of the rapid filling phase and the charge pressure phase to reduce the divergence, wherein the precalculated nominal transmission output speed curve is an average of a calculation pattern of actual values of one of an output speed, a turbine speed, or a speed signal equivalent thereto, during a defined time window.

5. A method for control of a transmission of a motor vehicle with hydraulically actuatable shifting elements wherein a shifting operation of a shifting element includes a rapid filling phase including a rapid filling time and a charge pressure phase wherein a charge pressure is provided to the element, comprising the steps of:

during a period outside of the shifting operation of the shifting element, detecting a divergence of a transmission output train speed signal from a precalculated nominal transmission output speed curve, and when the detected divergence is within one of a rapid filling phase tolerance band and a charge pressure tolerance band, generating an interference signal according to the divergence, the interference signal being one of a rapid filling time test pulse and a charge pressure test pulse, and superimposing the interference signal on a corresponding one of the rapid filling time of the rapid filling phase and the charge pressure of the charge pressure phase to adjust the one of the rapid filling phase and the charge pressure phase to reduce the divergence, thereby adapting the corresponding one of the rapid filling time of rapid filling phase and the charge pressure of the charge pressure phase by a corresponding offset value to provide an optimal filing of the shifting element.

6. The method according to claim 5, further comprising the step of:

adapting one of the rapid filling time and the charge pressure during a gear shift.

7. The method according claim 5, further comprising the steps of:

adapting one of the rapid filling time and the charge pressure in the period outside of the shifting operation of the shifting element, wherein
an adaptation is performed after a lapse of a retention cycle that is started with one of a gear shift, initiation of a gear shift, initiation of a gear, termination of the rapid filling test pulse and termination of the charge pressure test pulse.

8. The method according to claim 5, further comprising the step of:

using the rapid filling test pulse as the interference signal in adaptation of the rapid filling time of the shifting element, the rapid filling test pulse representing a loading of the shifting element with a preset rapid filling pressure imposed over a preset rapid felling pulse time.

9. The method according to claim 8, further comprising the step of:

after imposing a first rapid filling test pulse on the rapid filling time of the shifting element, detecting the divergence of the transmission output train speed signal from the precalculated nominal transmission output speed curve wherein the divergence is outside of the tolerance band, and correcting the rapid filling time by an offset value, and again loading the shifting element with the first rapid filling test pulse during an adapted rapid filling pulse time.

10. The method according to claim 9, comprising the steps of:

after loading the first rapid filling test pulse on the rapid filling time of the shifting element, detecting the divergence of the transmission output train speed signal from the precalculated nominal transmission output speed curve wherein the divergence is within the tolerance band, and detecting an expected reaction in one of a transmission output speed curve and a transmission turbine speed curve, and confirming the detected divergence by loading the shifting element with a second rapid filling test pulse over the rapid filling pulse time of the first rapid filling test pulse.

11. The method according to claim 10, further comprising the steps of:

after loading the shifting element with the second rapid filling test pulse, detecting the divergence of the transmission output train speed signal from the precalculated nominal transmission output speed curve that is lower than a threshold value, and imposing the first rapid filling test pulse on the shifting element over an actually adjusted rapid filling pulse time, detecting the divergence of a transmission output train speed signal from the precalculated nominal transmission output speed curve that is higher than the threshold value, and reducing the actual rapid filling pulse time by the offset value, and loading the shifting element with a third rapid filling test pulse over a re-adapted rapid filling pulse time.

12. The method according to claim 11, further comprising the steps of:

after loading the shifting element with the third rapid filling test pulse, detecting the divergence of the transmission output train speed signal from the precalculated nominal transmission output speed curve that is higher than the threshold value, and reducing the actual rapid filling pulse time by the offset value, and loading the shifting element with the third rapid filling test pulse over the re-adapted rapid filling pulse time, detecting the divergence of the transmission output train speed signal from the precalculated nominal transmission output speed curve that is lower than the threshold value, and loading the shifting element with a fourth rapid filling test pulse over the actual rapid filling pulse time.

13. The method according to claim 12, further comprising the steps of:

after loading the shifting element with the fourth rapid filling test pulse, detecting the divergence of the transmission output train speed signal from the precalculated nominal transmission output speed curve that is higher than the threshold value, and reducing the actual rapid filling pulse time by the offset value, and loading the shifting element with the third rapid filling test pulse over the reduced rapid filling pulse time, detecting the divergence of the transmission output train speed signal from the precalculated nominal transmission output speed curve that is lower than the threshold value, and detecting the expected reaction in one of the transmission output speed curve and the transmission turbine speed curve, and storing the actual rapid filling pulse time as a new adapted rapid filling time in an adaptation memory of an electronic control to be the rapid filling time of the rapid filling phase of the shifting element.

14. The method according to claim 5, further comprising the step of:

when the charge pressure to the shifting element has been adapted and the shifting element is controlled with the rapid filling test pulse, performing a hysteresis compensation.

15. The method according to claim 14, further comprising the steps of:

after loading of the shifting element by the rapid filling test pulse, loading the shifting element with a preset charge pressure over a defined period, after the defined period and after adaptation of the charge pressure, imposing the charge pressure test pulse on the shifting element as the interference signal, the interference signal thereby representing a constructive loading of the shifting element with a preset charge pressure pulse pressure imposed on the charge pressure over a preset charge pressure pulse time.

16. The method according to claim 15, further comprising the steps of:

after loading the shifting element with the first charge pressure test pulse in the charge pressure phase of the shifting element, detecting the divergence of the transmission output train speed signal from the precalculated nominal transmission output speed curve that is outside the tolerance band, and correcting the charge pressure by offset value, and during the first charge pressure test pulse, constructively loading the shifting element with the charge pressure pulse having a pressure that is a corrected charge pressure.

17. The method according to claim 16, further comprising the steps of:

after loading the shifting element with the first charge pressure test pulse within a second tolerance band, and detecting an expected reaction in one of a transmission output speed curve and a transmission turbine speed curve, imposing the second charge pressure test pulse on the shifting element, and confirming the expected reaction by constructively loading the shifting element with the charge pressure pulse to an actual charge pressure of the first charge pressure test pulse.

18. The method according to claim 17, further comprising the steps of:

after loading the shifting element with a second charge pressure, detecting the divergence of the transmission output train speed signal from the precalculated nominal transmission output speed curve that is lower than a threshold value, and loading the shifting element during the first charge pressure test pulse with the charge pressure pulse having the pressure that is the corrected actual charge pressure, detecting the divergence of the transmission output train speed signal from a precalculated nominal transmission output speed curve that is higher than the threshold value, and loading the shifting element with a fourth rapid filling test pulse over an actual rapid filling pulse time;

reducing the actual charge pressure the offset value, and constructively loading the shifting element during a third charge pressure test pulse having a pressure that is a reduced actual charge pressure.

19. The method according to 18, further comprising the steps of:

after loading the shifting element with a the third charge pressure test pulse, detecting the divergence of the transmission output train speed signal from the precalculated nominal transmission output speed curve that is higher than the threshold value, and reducing the actual charge pressure by the offset value, and during the third charge pressure test pulse, constructively loading the shifting element with the charge pressure pulse to the reduced actual charge pressure, detecting the divergence of the transmission output train speed signal from the precalculated nominal transmission output speed curve that is lower than the threshold value, and during a fourth charge pressure test pulse, constructively loading the shifting element with a charge pressure pulse to the corrected actual charge pressure during the fourth rapid filling test pulse and over an actual rapid filling pulse time.

20. The method according to claim 19, further comprising the steps of;

after loading the shifting element with the fourth charge pressure test pulse, detecting determining the divergence of the transmission output train speed signal from the precalculated nominal transmission output speed curve that is higher than the threshold value, and
  reducing the actual charge pressure by the offset value, and
  during the third charge pressure test pulse, constructively loading the shifting element with the charge pressure pulse to the reduced actual charge pressure,
detecting the divergence of the transmission output train speed signal from the precalculated nominal transmission output speed curve that is lower than the threshold value, and
detecting the expected reaction in one of the transmission output speed curve and the transmission turbine speed curve, and
  storing the actual charge pressure as a new adapted charge pressure in an adaptation memory of an electronic control to be the charge pressure of the filling phase of the shifting element.

* * * * *